(12) United States Patent
Oelerich et al.

(10) Patent No.: US 7,984,653 B2
(45) Date of Patent: Jul. 26, 2011

(54) ANGULAR MOUNTED HIGH-PRESSURE VESSEL

(75) Inventors: Wolfgang Oelerich, Wiesbaden (DE); Bryan J. Stewart, New Hudson, MI (US); Mohsen D. Shabana, Farmington Hills, MI (US); Steven P. Balgaard, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 55 days.

(21) Appl. No.: 12/638,540

(22) Filed: Dec. 15, 2009

(65) Prior Publication Data
US 2011/0138923 A1  Jun. 16, 2011

(51) Int. Cl.
*G01L 7/00* (2006.01)
*A47G 23/02* (2006.01)

(52) U.S. Cl. ......................................... 73/756; 248/154

(58) Field of Classification Search .................. None
See application file for complete search history.

(56) References Cited

U.S. PATENT DOCUMENTS

| | | | | |
|---|---|---|---|---|
| 5,308,101 A * | 5/1994 | Monty | | 280/480.1 |
| 6,536,722 B2 * | 3/2003 | Sadowski et al. | | 248/154 |
| 6,557,814 B1 * | 5/2003 | Rutz | | 248/505 |
| 7,028,553 B2 * | 4/2006 | Smith et al. | | 73/756 |
| 2003/0006349 A1 * | 1/2003 | Sadowski et al. | | 248/154 |

* cited by examiner

*Primary Examiner* — Andre J Allen
(74) *Attorney, Agent, or Firm* — Fraser Clemens Martin & Miller LLC; J. Douglas Miller

(57) ABSTRACT

A mounting system includes a pressure vessel having a longitudinal axis, a retaining strap disposed around the pressure vessel, a carrier element having an aperture formed therein to receive the retaining strap therethrough to secure the carrier element to the pressure vessel, and a mounting element coupled to the carrier element and adapted to be coupled to a mounting point to secure the pressure vessel, wherein the longitudinal axis of the pressure vessel is disposed at an non-horizontal resting angle.

20 Claims, 2 Drawing Sheets

ANGULAR MOUNTED HIGH-PRESSURE VESSEL

FIELD OF THE INVENTION

The present invention is directed to a pressure vessel for storing a fluid. More particularly, the invention is directed to a system and a method for mounting the pressure vessel in a vehicle.

BACKGROUND OF THE INVENTION

The advent of low floor transit vehicles fueled by alternative fuels such as compressed natural gas (CNG), liquefied natural gas (LNG) or hydrogen, has resulted in the need to mount fuel storage means in the form of pressurized vessels to the vehicle.

Typically, in order to achieve a driving range similar to a diesel vehicle and to achieve safety standards associated with alternative fuels, a plurality of pressure vessels must be used. In order to reduce the weight of such fuel storage systems, lightweight composite pressure vessels and mounting systems are used.

In order to meet ANSI/AGA NGV2 and CSA B51 certification in both the U.S. and Canada, the mounting systems must be designed to accommodate radial and axial growth of the fuel pressure vessels as a result of pressurization thereof. Further, the pressure vessels must withstand dynamic loading. The dynamic loads may be specified in terms of multiples of gravity. The loading design is dependent on the orientation of the vessel. In Canada, where pressure vessels are typically oriented in the same direction as travel of the vehicle, the design dynamic loading must be at least 20 g in the longitudinal direction of the vehicle and 8 g in any other direction. These loads supersede those required for normal operation and are generally more stringent than those imposed in the U.S., where vessels are oriented in the same direction. Further, a maximum allowable deflection of 0.5 inches (12.5 mm) for mounting brackets is required when tested at 8 g. When pressure vessels are mounted crosswise to the direction of travel, such as is the convention in Europe and Japan, the current design crash loads are 100 g in all directions. The standards periodically change.

In 1998, Lincoln Composites (Lincoln, Nebr., U.S.A.), a division of Advanced Technical Products, Inc., disclosed a modular concept for roof mounting utilizing a lightweight truss frame, expandable to accommodate various lengths of pressure vessels. Integration of the modules to a bus roof is accomplished by utilizing mounting brackets that can be relocated along the length of the modules to correspond with the roof "hard points" or rigid frame structure. The modular frame includes a plurality of end members disposed between two longitudinal rails and a plurality of truss-like central frame members disposed parallel to the longitudinal rails. The pressure vessels are positioned lengthwise in parallel with the central frame members, thereby separating the pressure vessels from each other and adding structural rigidity to the modular frame.

Other frames have been designed to meet safety requirements and weight restrictions. One such known design is typically used for roof-mounting in low floor buses comprising a frame structure of end members and cross members. The frame has steel straps at two places along each pressure vessel, clamping each pressure vessel into the frame.

In the Lincoln Composites system described above, pressure vessels are positioned with a longitudinal axis oriented in the same direction as the longitudinal axis of the vehicle. In other known frames, pressure vessels are oriented with the longitudinal axis at 90 degrees to the frame rails and the longitudinal axis of the vehicle. The differences in orientation of the pressure vessels are representative of differences in mounting conventions between North America and those in Japan and Europe.

It would be desirable to have a mounting system and a method for mounting a pressure vessel, wherein the system and method maximize a vessel capacity and dynamic load performance.

SUMMARY OF THE INVENTION

Concordant and consistent with the present invention, a mounting system and a method for mounting a pressure vessel, wherein the system and method maximize a vessel capacity and dynamic load performance, has surprisingly been discovered.

In one embodiment, a mounting system comprises: a pressure vessel having a longitudinal axis; a retaining strap disposed around the pressure vessel; a carrier element having an aperture formed therein to receive the retaining strap therethrough to secure the carrier element to the pressure vessel; and a mounting element coupled to the carrier element and adapted to be coupled to a mounting point to secure the pressure vessel, wherein the longitudinal axis of the pressure vessel is disposed at an non-horizontal resting angle.

In another embodiment, a mounting system comprises: a pressure vessel having a longitudinal axis; a retaining strap disposed around the pressure vessel; a carrier element having an aperture formed therein to receive the retaining strap therethrough to secure the carrier element to the pressure vessel; and a plurality of mounting elements coupled to the carrier element and each of the mounting elements adapted to be coupled to a mounting point to secure the pressure vessel, wherein the longitudinal axis of the pressure vessel is disposed at an non-horizontal resting angle.

The invention also provides methods for mounting a pressure vessel to a vehicle.

One method comprises the steps of: providing a pressure vessel having a longitudinal axis; providing a mounting element secured to a mounting point of the vehicle; securing a carrier element to the pressure vessel; and coupling the carrier element to the mounting element to secure the pressure vessel, wherein the longitudinal axis of the pressure vessel is disposed at an non-horizontal resting angle.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention.

The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
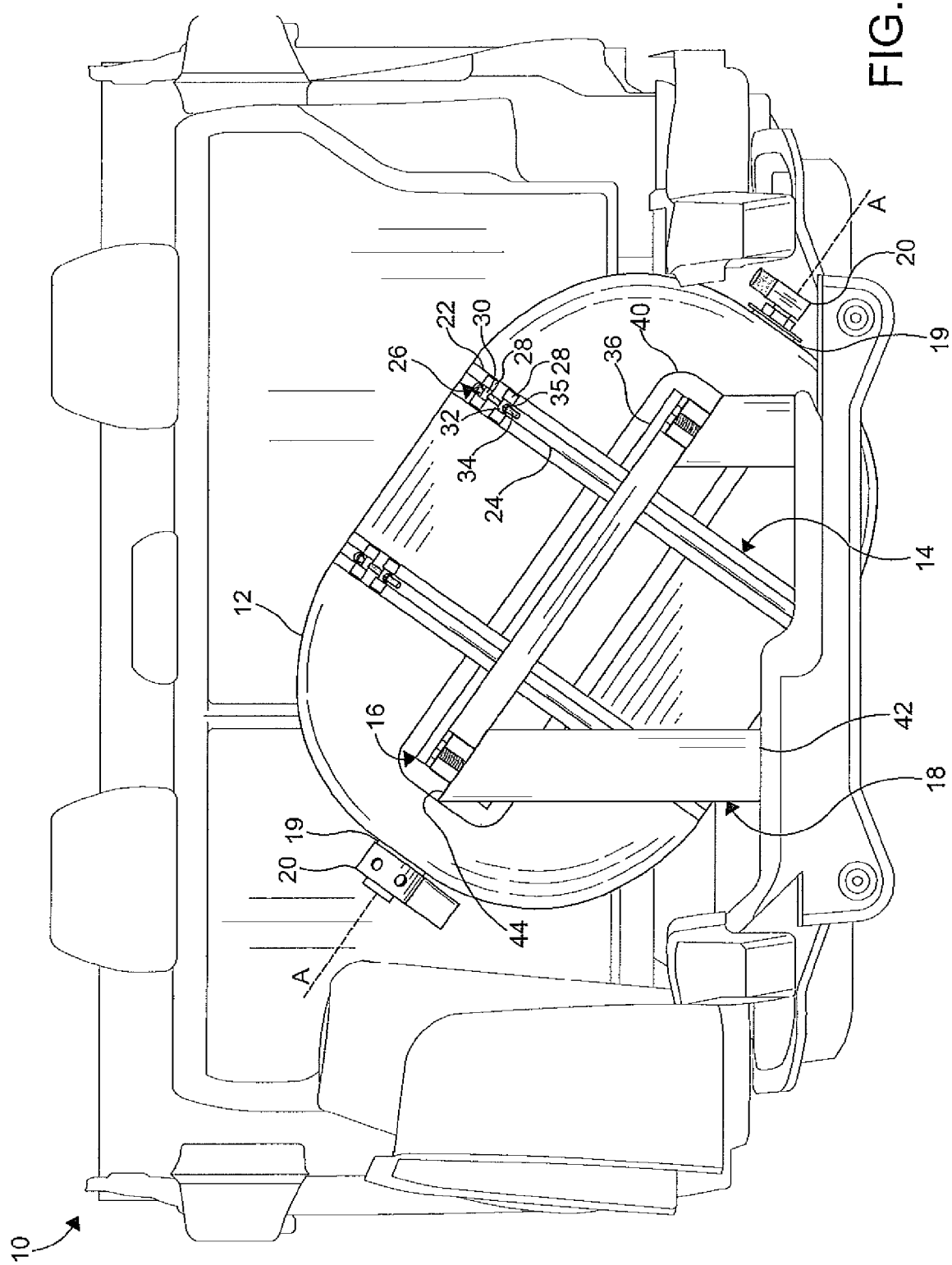
FIG. 1 is a rear elevational view of a vehicle including a mounting system according to an embodiment of the present invention.

FIG. 1 illustrates a mounting system 10 for a pressure vessel 12 according to an embodiment of the present invention. As shown, the mounting system 10 is disposed behind a rear seat of a fuel cell vehicle. However, it is understood that the mounting system 10 may be disposed in any vehicle and in any location within the vehicle. The mounting system 10 includes a plurality of retaining straps 14, a plurality of carrier elements 16, and a plurality of mounting elements 18.

The pressure vessel 12 typically includes an inner polymeric liner and a wound outer shell having an exterior surface. The wound outer shell is typically formed with a filament winding process and may be formed from any conventional material such as a carbon fiber, a glass fiber, a composite fiber, and a fiber having a resin coating. Alternately, the wound outer shell may be formed from any moldable material such as a metal and a plastic. A vessel opening 19 is typically formed at an end of the pressure vessel 12 and provides an attachment point for a utility device 20 such as a fluid control fixture, a valve, a regulator, and other devices that may be attached thereto. As a non-limiting example, the pressure vessel 12 is adapted to store and dispense gaseous hydrogen for use by a fuel cell system (not shown). However, any fluid may be stored in the pressure vessel 12.

The retaining straps 14 are disposed around a periphery of the pressure vessel 12 to secure the pressure vessel 12 to the carrier elements 16. As shown, each of the retaining straps 14 includes an engaging strap 22, a tension strap 24, and a tension control element 26.

The engaging strap 22 is typically formed from rubber. However, other resilient materials may be used. The engaging strap 22 is disposed around a periphery of the pressure vessel 12 and substantially conforms to a shape of the pressure vessel 12. The engaging strap 22 allows for the pressure vessel 12 to change in size due to pressure and temperature variations.

The tension strap 24 is disposed around the engaging strap 22, thereby sandwiching the engaging strap 22 between the tension strap 24 and the pressure vessel 12. The tension strap 24 is typical formed from a metal such as stainless steel and is adjustable to receive pressure vessels of varying sizes and shapes.

Figure 2:
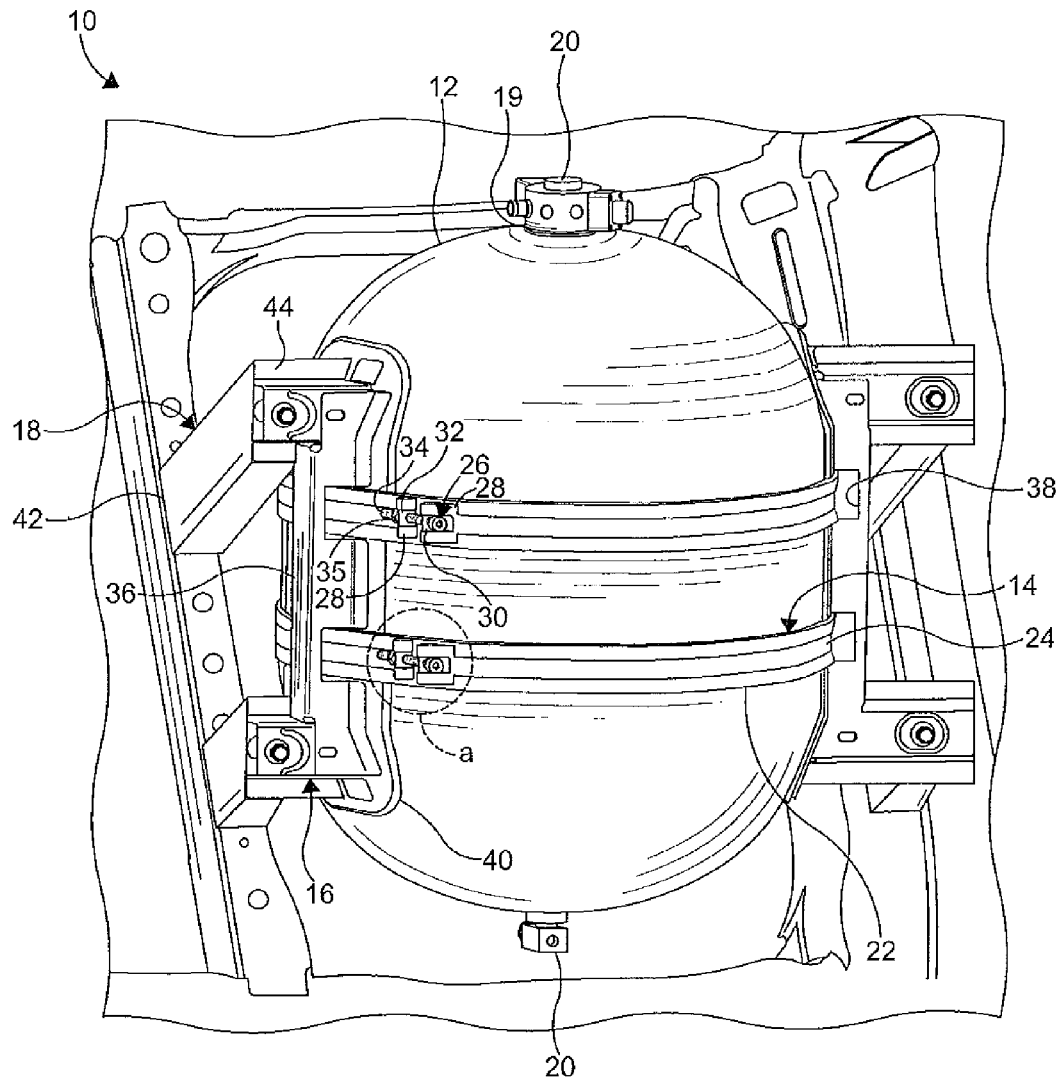
FIG. 2 is a top perspective view of the mounting system of FIG. 1.
Figure 2A:
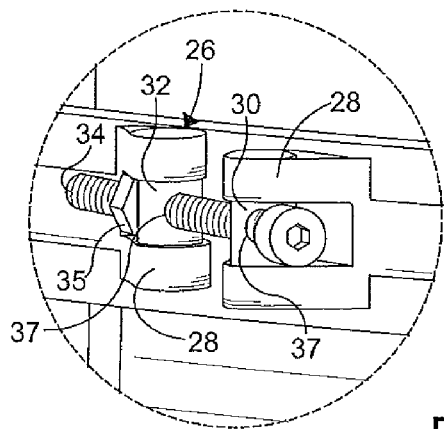
FIG. 2a is an enlarged fragmentary perspective view of a tension control element depicted by circle "a" in FIG. 2.

As more clearly shown in FIG. 2a, each end of the tension strap 24 includes a coupling feature 28 for receiving and securing the tension control element 26 to the tension strap 24. The tension control element 26 is securely coupled to the tension strap 24. As shown, the tension control element 26 includes a first retention device 30, a second retention device 32, a bolt 34 and a nut 35. As a non-limiting example, each of the retention devices 30, 32 has a cylindrical body with an aperture 37 formed therethrough to receive the bolt 34. However, it is understood that other shapes may be used. It is further understood that other means for coupling opposing ends of the tension strap 24 may be used.

The first retention device 30 is disposed in one of the coupling features 28 of the tension strap 24. The second retention device 32 is disposed in another one of the coupling features 28 of the tension strap 24 facilitate coupling the opposing ends of the tension strap 24. The bolt 34 is disposed through the apertures 37 formed in each of the retention devices 30, 32. The nut 35 is disposed on the bolt 34 to engage the thread formed thereon. It is understood that a rotation of the nut 35 causes the nut 35 to travel along a length of the bolt 34, thereby urging the second retention device 32 towards the first retention device 30. As a result, the tension strap 24 is drawn tight, and applies a compressive force to the pressure vessel 12. It is understood that a tension and circumference of the tension bands 24 may be adjusted to accommodate an expansion or a contraction of the pressure vessel 12.

The carrier elements 16 each include a main body 36 having a plurality of apertures 38 for receiving the retaining straps 14. In the embodiment shown, an engaging pad 40 is disposed between the main body 36 of each of the carrier elements 16 and the pressure vessel 12. The main body 36 is typical formed from a metal and is coupled to the mounting elements 18 to secure the pressure vessel 12 to the vehicle. The engaging pads 40 secure the pressure vessel 12 to the carrier elements 16 and allow for the pressure vessel 12 to change in size due to pressure and temperature variations.

The mounting elements 18 are disposed between the carrier elements 16 and a mounting point of the vehicle to provide a desired storage angle or resting angle for the pressure vessel 12. As a non-limiting example, the mounting point is a frame of the vehicle. Each of the mounting elements 18 includes a first end 42 and a second end 44. As shown, the first end 42 of each of the mounting elements is coupled to the mounting point of the vehicle. The second end 44 of each of the mounting elements 18 is beveled and coupled to at least one of the carrier elements 16. As shown, each of the mounting elements 18 has a pre-determined length to secure the pressure vessel 12 at a pre-determined angle relative to a horizontal plane. The bevel angle on each of the second ends 44 of the mounting elements 18 is also pre-determined to provide a collinear mounting surface for the carrier elements 18. It is understood that by modifying the relative lengths of each of the mounting elements 18 and the bevel angle of the second ends 44 thereof, the resting angle of the pressure vessel 12 may be changed. It is further understood that the ends 42, 44 of the mounting elements 18 may have any angle.

In use, the carrier elements 16 are disposed adjacent the formed pressure vessel 12. The retaining straps 14 are disposed through the apertures 38 formed in the carrier elements 16 and around a periphery of the pressure vessel 12. The tension control elements 26 are adjusted to modify a circumference and diameter of the retaining straps 14 and thereby secure the carrier elements 16 to an outside surface of the pressure vessel 12. The pressure vessel 12 is then mounted into a vehicle having the mounting elements 18 secured to a frame thereof. Specifically, the carrier elements 16 are coupled to the mounting elements 18 such that the pressure vessel 12 is secured in a storage position having a pre-determined resting angle. The resting angle is a non-horizontal angle, wherein a longitudinal axis A' of the pressure vessel 12 is disposed at an oblique angle relative to a horizontal plane that is generally parallel with a level ground. Unlike currently used storage vessels, the pressure vessel 12 is not mounted longitudinal or transversal to a driving direction of the vehicle but with an angle relative to the horizontal plane and, in certain embodiments, a frame of the vehicle.

A storage capacity of a conventionally mounted pressure vessel is limited by a frame or a rigid structure of the vehicle in the longitudinal and transverse directions. The mounting system 10 according to the present invention maximizes a storage capacity of the pressure vessel 12 because a length of the pressure vessel 12 may be maximized. By mounting the pressure vessel 12 along a longitudinal axis that is oblique with respect to the horizontal plane, the pressure vessel 12 may be designed to maximize use of an available packing space.

Similarly, dynamic load performance (e.g. improved load clearance) is maximized since the vessel opening 19 is not in direct alignment with a portion of the vehicle frame. The resting angle of the pressure vessel 12 maximizes a space adjacent the utility devices 20 mounted to the vessel opening 19, thereby maximizing assembly options. For example, the pressure vessel 12 could expand and still be able to pass through a longitudinal rail of the vehicle during mounting and assembly. As a further example, the mounting system 10 with an oblique resting angle of the pressure vessel relative to a horizontal plane maximizes a mass efficient aspect ratio of the pressure vessel 12.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A mounting system comprising:
    a pressure vessel having a longitudinal axis;
    a retaining strap disposed around the pressure vessel;
    a carrier element having an aperture formed therein to receive the retaining strap therethrough to secure the carrier element to the pressure vessel; and
    a mounting element coupled to the carrier element and adapted to be coupled to a mounting point to secure the pressure vessel, wherein the longitudinal axis of the pressure vessel is disposed at an non-horizontal resting angle.

2. The mounting system according to claim 1, wherein the retaining strap includes a tension control element coupled to a tension strap to secure the pressure vessel.

3. The mounting system according to claim 2, wherein the tension control element includes a bolt, a retention device for receiving the bolt, and a nut for securing the bolt to the retention device.

4. The mounting system according to claim 2, wherein the retaining strap includes an engaging strap disposed between the tension strap and the pressure vessel, the engaging strap securing a position of the retaining strap relative to the pressure vessel while allowing for an expansion and a contraction of the pressure vessel.

5. The mounting system according to claim 1, further comprising an engaging pad disposed between the carrier element and the pressure vessel, wherein the engaging pad secures a position of the carrier element relative to the pressure vessel while allowing for an expansion and a contraction of the pressure vessel.

6. The mounting system according to claim 1, wherein the mounting element has a first end coupled to the mounting point and a second end coupled to the carrier element, and wherein at least one of the first end and the second end is beveled to a pre-determined angle.

7. The mounting system according to claim 1, wherein the mounting system is disposed in a vehicle and the mounting point is a frame of the vehicle.

8. The mounting system according to claim 1, wherein the mounting system is disposed in a fuel cell vehicle and the pressure vessel stores a fluid to be used by the fuel cell vehicle.

9. A mounting system comprising:
    a pressure vessel having a longitudinal axis;
    a retaining strap disposed around the pressure vessel;
    a carrier element having an aperture formed therein to receive the retaining strap therethrough to secure the carrier element to the pressure vessel; and
    a plurality of mounting elements coupled to the carrier element and each of the mounting elements adapted to be coupled to a mounting point to secure the pressure vessel, wherein the longitudinal axis of the pressure vessel is disposed at an non-horizontal resting angle.

10. The mounting system according to claim 9, wherein the retaining strap includes a tension control element coupled to a tension strap to secure the pressure vessel.

11. The mounting system according to claim 10, wherein the tension control element includes a bolt, a retention device for receiving the bolt, and a nut for securing the bolt to the retention device.

12. The mounting system according to claim 10, wherein the retaining strap includes an engaging strap disposed between the tension strap and the pressure vessel, the engaging strap securing a position of the retaining strap relative to the pressure vessel while allowing for an expansion and a contraction of the pressure vessel.

13. The mounting system according to claim 9, further comprising an engaging pad disposed between the carrier element and the pressure vessel, wherein the engaging pad secures a position of the carrier element relative to the pressure vessel while allowing for an expansion and a contraction of the pressure vessel.

14. The mounting system according to claim 9, wherein each of the mounting elements has a first end coupled to the rigid structure and a second end coupled to the carrier elements, wherein at least one of the first end and the second end is beveled to a pre-determined angle.

15. The mounting system according to claim 9, wherein the mounting system is disposed in a vehicle and the mounting point is a frame of the vehicle.

16. The mounting system according to claim 9, wherein the mounting system is disposed in a fuel cell vehicle and the pressure vessel stores a fluid to be used by the fuel cell vehicle.

17. A method for mounting a pressure vessel in a vehicle, the method comprising the steps of:
    providing a pressure vessel having a longitudinal axis;
    providing a mounting element secured to a mounting point of the vehicle;
    securing a carrier element to the pressure vessel; and
    coupling the carrier element to the mounting element to secure the pressure vessel, wherein the longitudinal axis of the pressure vessel is disposed at an non-horizontal resting angle.

18. The mounting system according to claim 17, wherein the retaining strap includes a tension control element coupled to a tension strap to secure the pressure vessel.

19. The mounting system according to claim 17, wherein the mounting element has a first end coupled to the mounting point and a second end coupled to the carrier element, and wherein at least one of the first end and the second end is beveled to a pre-determined angle.

20. The mounting system according to claim 17, wherein the mounting point is a frame of the vehicle.

* * * * *